US012678785B2

(12) United States Patent
Govyadinov et al.

(10) Patent No.: US 12,678,785 B2
(45) Date of Patent: Jul. 14, 2026

(54) REAGENT DELIVERY NETWORKS

(71) Applicant: Hewlett-Packard Development Company, L.P., Spring, TX (US)

(72) Inventors: Alexander Govyadinov, Corvallis, OR (US); Viktor Shkolnikov, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 838 days.

(21) Appl. No.: 17/876,642

(22) Filed: Jul. 29, 2022

(65) Prior Publication Data

US 2024/0033729 A1 Feb. 1, 2024

(51) Int. Cl.
*B01L 3/00* (2006.01)

(52) U.S. Cl.
CPC ..... *B01L 3/502715* (2013.01); *B01L 3/50273* (2013.01); *B01L 2200/16* (2013.01)

(58) Field of Classification Search
CPC ....... B01L 2200/027; B01L 2200/0647; B01L 2200/16; B01L 2300/0816; B01L 2300/0867; B01L 2300/087; B01L 2300/18; B01L 2300/1827; B01L 2400/0442; B01L 2400/0487; B01L 2400/0688; B01L 2400/086; B01L 3/502715; B01L 3/50273; B01L 3/502746; B01L 3/52; B01L 2400/0433; B01L 2400/0436; B01L 2400/0439
See application file for complete search history.

(56) References Cited

U.S. PATENT DOCUMENTS

| | | | | |
|---|---|---|---|---|
| 6,910,797 | B2 * | 6/2005 | Falcon | B01F 33/3031 366/127 |
| 2009/0325276 | A1 | 12/2009 | Battrell et al. | |
| 2013/0178378 | A1 | 7/2013 | Hatch et al. | |
| 2013/0224744 | A1 | 8/2013 | Renna et al. | |
| 2018/0043362 | A1 | 2/2018 | Rogacs et al. | |
| 2019/0072547 | A1 | 3/2019 | Ahn et al. | |
| 2020/0173581 | A1 | 6/2020 | Olbrich et al. | |
| 2021/0010488 | A1 * | 1/2021 | Torniainen | B81B 1/006 |
| 2021/0170408 | A1 | 6/2021 | Kornilovich et al. | |

FOREIGN PATENT DOCUMENTS

| | | | |
|---|---|---|---|
| CN | 109370896 | A | 2/2019 |
| CN | 209338556 | U | 9/2019 |
| WO | 2008/143646 | A2 | 11/2008 |
| WO | 2018/151721 | A1 | 8/2018 |

* cited by examiner

*Primary Examiner* — Benjamin R Whatley
(74) *Attorney, Agent, or Firm* — FOLEY & LARDNER LLP

(57) ABSTRACT

A reagent delivery network can include an inlet microfluidic channel, a microfluidic cross-channel branching off from the inlet microfluidic channel, a resistor positioned along the inlet microfluidic channel at a location to redirect fluid from the inlet microfluidic channel into the microfluidic cross-channel, and an outlet microfluidic channel having a side-wall opening connected to the microfluidic cross-channel. The outlet microfluidic channel can receive fluid from the microfluidic cross-channel. The microfluidic cross-channel can include a constriction region and a reagent storage chamber having reagent therein.

14 Claims, 6 Drawing Sheets

REAGENT DELIVERY NETWORKS

BACKGROUND

Microfluidic devices have applicability for use within a wide range of industries, including pharmaceutical, life science research, medical research, and forensic applications to name a few. For example, these types of devices can be used to evaluate or analyze fluids using very small quantities of sample and/or reagent to interact with the sample than would otherwise be used with full-scale analysis devices or systems.

DETAILED DESCRIPTION

Figure 1:
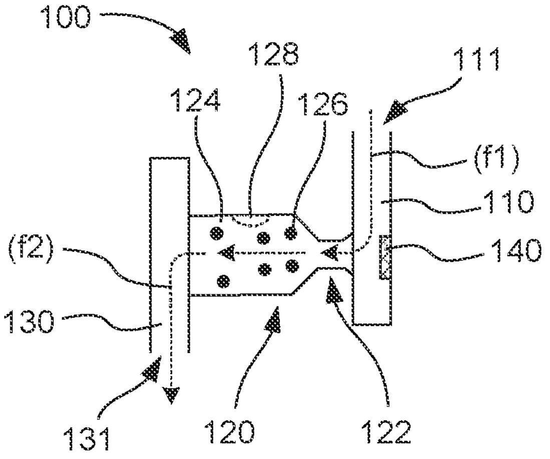
FIGS. 1-6 depict schematic views of various example reagent delivery networks in accordance with the present disclosure.

Microfluidic devices can permit the analysis of a fluid on the micro-scale. These devices utilize smaller volumes of a fluid and reagents during the analysis then would otherwise be used for a full-scale analysis. In addition, microfluidic devices can also allow for parallel analysis thereby providing faster analysis of a fluid. For example, during sample analysis, a reagent can interact with the sample fluid to cause a reaction. However, introducing the reagent during sample analysis can increase the cost and demand higher skills associated with the analysis, as well as increase time associated with conducting sample analysis and potentially increase the possibility of error. As an example, reagent delivery networks and/or the microfluidic processing systems of the present disclosure can be used for a variety of processes that may be tailored by an end user, depending on what reagents and/or processes may be useful. For example, in a system where there is the ability for multiplexing (or the ability to sequentially add reagent from a reagent delivery network or multiple reagent delivery networks), the reagent storage chambers described herein may store any of a number of reagents, such as enzymes, chelating agents, primers for nucleic acid amplifications, reactants, etc. Thus, when multiplexing within a microfluidic network and/or multiplexing using multiple microfluidic networks connected in parallel or series fluidically, reagents may be selected by an end user to be used additively or sequentially as may be desired for a given application. In some instances, decisions can be made by a user or a machine as to what to include next in a process based on results from a prior step, leveraging flexibility for on the fly processing, e.g., diagnostics, amplification, assays, cheating, enzyme processing, etc.

In accordance with examples of the present disclosure, a reagent delivery network includes an inlet microfluidic channel, a microfluidic cross-channel, and an outlet microfluidic channel. The microfluidic cross-channel in this example branches off from the inlet microfluidic channel and includes a constriction region and a reagent storage chamber having reagent therein. The outlet microfluidic channel includes a side-wall opening connected to the microfluidic cross-channel and the outlet microfluidic channel is configured to receive fluid from the microfluidic cross-channel. A resistor is positioned along the inlet microfluidic channel at a location to redirect fluid from the inlet microfluidic channel into the microfluidic cross-channel. In one example, the resistor in operation provides a power density in the presence of a fluid to generate pressure sufficient to break a capillary retention meniscus at the constriction region to deliver the fluid into the reagent storage changer, e.g., from 100 $MW/m^2$ to 1,000 $MW/m^2$. The microfluidic cross-channel in some examples includes a second constriction region adjacent to the outlet microfluidic channel. In this instance, the reagent delivery network can further include a second resistor positioned along the outlet microfluidic channel at a location to generate fluid flow between the outlet microfluidic channel and the microfluidic cross-channel. In some examples, a chamber resistor (or multiple chamber resistors), which are different than the resistors found along the inlet and/or outlet microfluidic channels, can be located within the reagent storage chamber to mix the reagent with fluid to reconstitute the reagent. In some more specific examples, the reagent delivery network can include multiple microfluidic cross-channels fluidically independently coupling the inlet microfluidic channel with the outlet microfluidic channel in series. For example, the multiple microfluidic cross-channels can include the microfluidic cross-channel recited above which includes the reagent storage chamber, but can also include a second microfluidic cross-channel having a second reagent storage chamber. Thus, the reagent storage chamber contains the reagent and the second reagent storage chamber contains a second reagent that is different than the reagent. The reagent and/or the second reagent can independently include components to be reconstituted, such as a nucleic acid primer, a secondary antibody, a PCR mastermix component, an optical marker, or a mixture thereof. The reagent delivery network can be fluidly coupled in series with a second reagent delivery network. In this instance, the outlet microfluidic channel fluidically can feed or share a common structure with a second inlet microfluidic channel of the second reagent delivery network. In other examples, the reagent delivery network can be fluidly coupled to downstream microfluidics, such as a microfluidic processing channel, via the microfluidic outlet channel, and a second reagent delivery network can be fluidly coupled in parallel to the microfluidic processing channel relative to the reagent delivery network via a second microfluidic outlet channel.

In other examples, a method of reconstituting reagent includes flowing fluid into an inlet microfluidic channel of a reagent delivery network, and forming a capillary retention meniscus at a constriction region of a microfluidic cross-channel branching off from the inlet microfluidic channel. The microfluidic cross-channel includes a reagent storage chamber containing a reagent positioned beyond the constriction region. The method also includes firing a resistor to generate a pressure change to break the capillary retention meniscus at the constriction region, and flowing fluid through the constriction region and into the reagent storage chamber to combine fluid with the reagent to form a reconstituted reagent. In some examples, the method can include flowing the reconstituted reagent from the reagent storage chamber into an outlet microfluidic channel. In other examples, the method can include mixing the reagent with fluid in the reagent storage chamber to form the reconstituted reagent using a second resistor to flow the fluid back toward the resistor, chamber resistors located within the reagent storage chamber, or both. In still other examples, after forming the reconstituted reagent, the method can further include forming a second capillary retention meniscus at a second constriction region of a second microfluidic cross-channel branching off from the inlet microfluidic channel. The second microfluidic cross-channel can include a second reagent storage chamber containing a second reagent positioned beyond the second constriction region. Furthermore, in this particular example, the method can include firing a second resistor to generate a pressure change to break the second capillary retention meniscus at the second constriction region, and flowing fluid through the second constriction region and into the second reagent storage chamber to combine fluid with the second reagent to form a second reconstituted reagent.

When discussing the reagent delivery networks and/or the methods of reconstituting reagent, such discussions can be considered applicable to one another whether or not they are explicitly discussed in the context of that example. Thus, for example, when discussing a reagent storage chamber in the context of a reagent delivery network, such disclosure is also relevant to and directly supported in the context of the methods, and vice versa.

Terms used herein will be interpreted as the ordinary meaning in the relevant technical field unless specified otherwise. In some instances, there are terms defined more specifically throughout or included at the end of the present disclosure, and thus, these terms are supplemented as having a meaning described herein.

Figure 10:
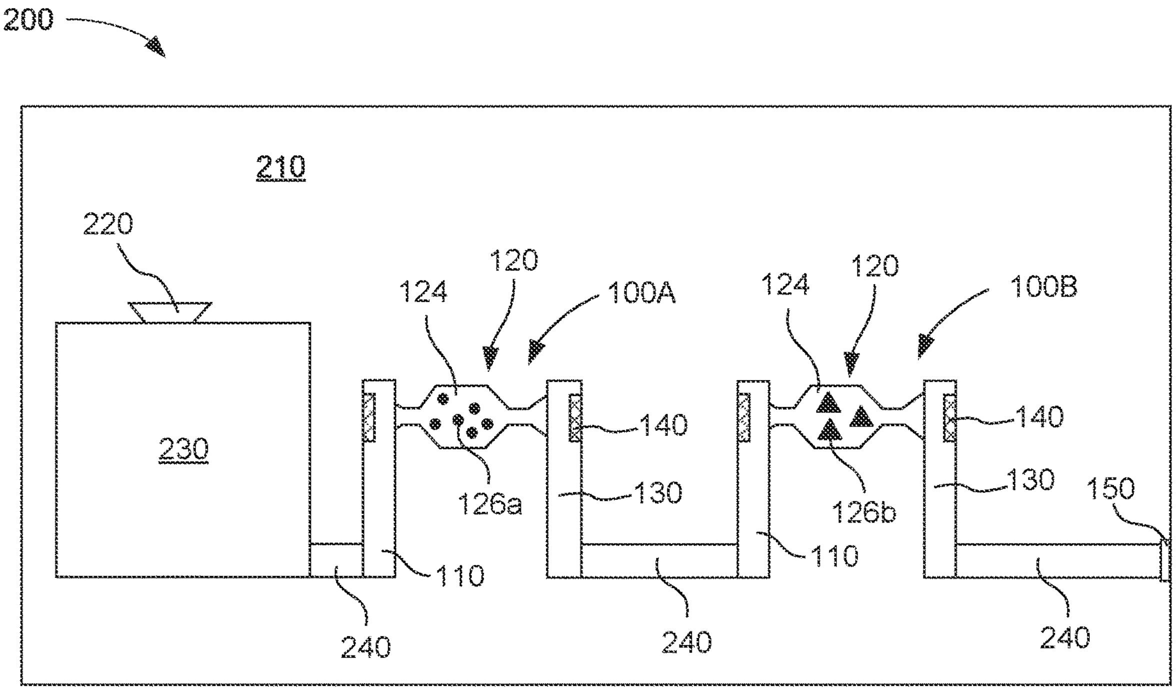
FIG. 10 is a schematic view of multiple example reagent delivery networks fluidly coupled to multiple microfluidic processing channels in series in accordance with the present disclosure.
Figure 11:
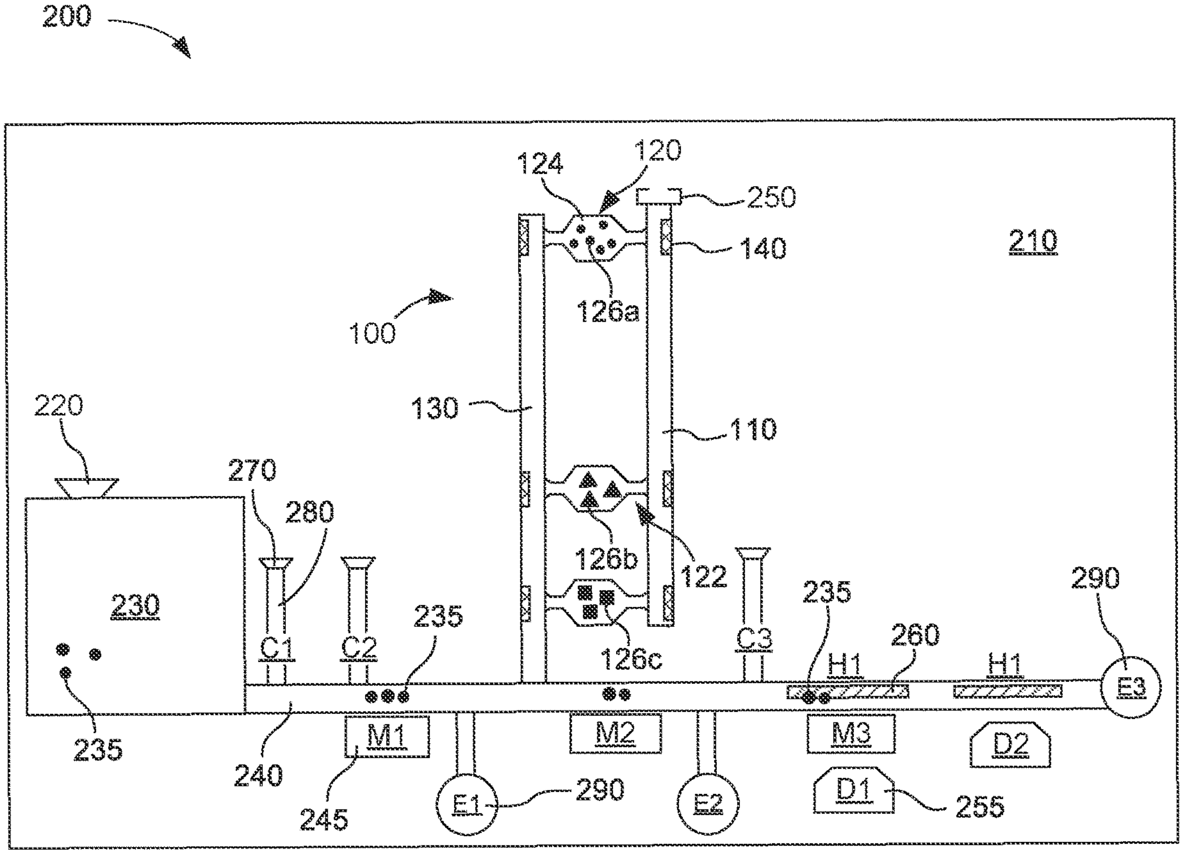
FIG. 11 is a schematic view of another example microfluidic processing system in accordance with the present disclosure.
Figure 12:
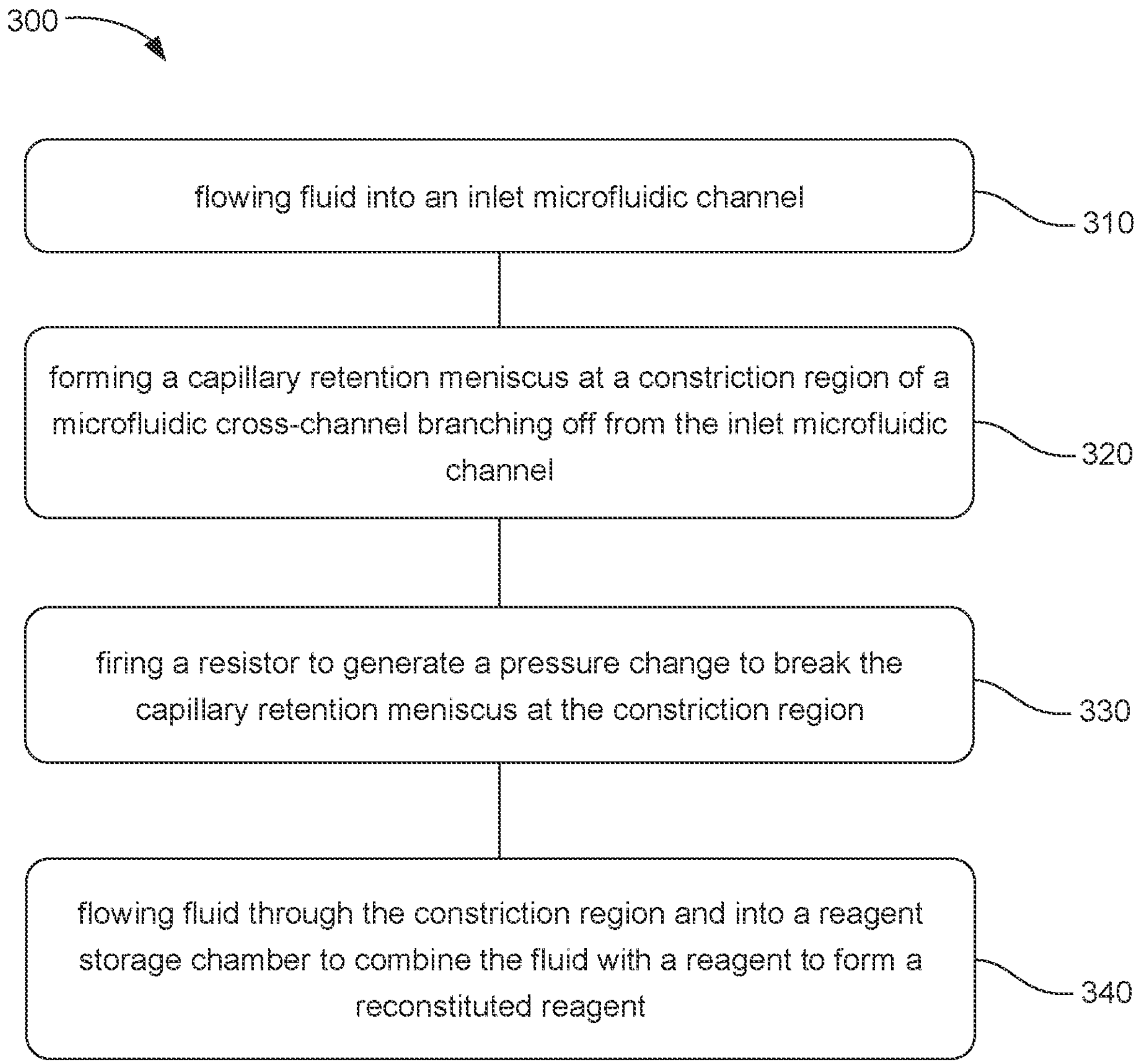
FIG. 12 is a flow diagram of an example method of reconstituting reagent in accordance with the present disclosure.

In accordance with the definitions and examples herein, FIGS. 1-6 depict various reagent delivery networks, FIGS. 7-11 depict various microfluidic processing systems, and FIG. 12 illustrates methods of the present disclosure. These various examples can include various features, with several features common from example to example. However, with respect to FIGS. 1-11, the reference numerals used to refer to features are the same throughout to avoid confusion, even though the reagent delivery networks and the microfluidic processing systems can have structural differences, as shown.

Reagent Delivery Networks

Referring now to FIG. 1, a schematic view of a reagent delivery network 100 is shown that can include an inlet microfluidic channel 110, a microfluidic cross-channel 120 branching off from the inlet microfluidic channel, an outlet microfluidic channel 130 having a side-wall opening connected to the microfluidic cross-channel to receive fluid from the microfluidic cross-channel, and a resistor 140 operable to generate a pressure sufficient to break the capillary retention meniscus when fluid is situated within the inlet microfluidic channel. The microfluidic cross-channel can branch off from the inlet microfluidic channel and can include a constriction region 122 having a size suitable to form a capillary retention meniscus and a reagent storage chamber 124 having reagent 126 therein, which may be a dried reagent, for example. The reagent storage chamber may further include a venting port 128 to allow for the exiting of solvent and/or gas from the reagent storage chamber as the reagent storage chamber is filled through the constriction region. In some examples, the venting port can be sealed with a protective film to minimize or prevent exposure of the reagent to external environmental conditions. The protective film may be removable, puncturable, or the like. A venting port can be present in any of the examples presented herein.

Figure 2:
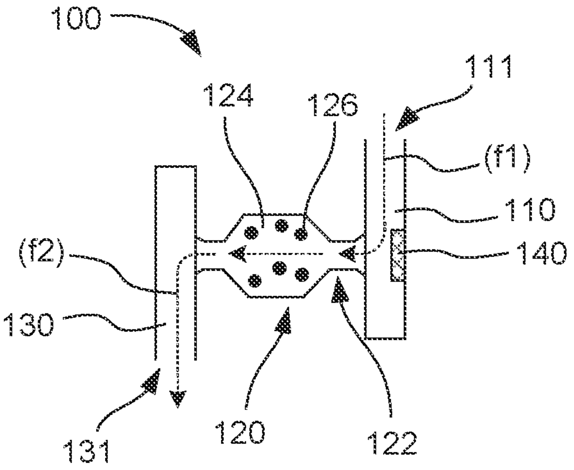
Figure 3:
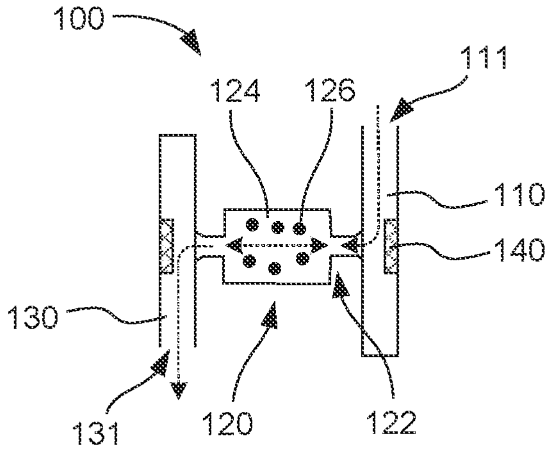
Figure 4:
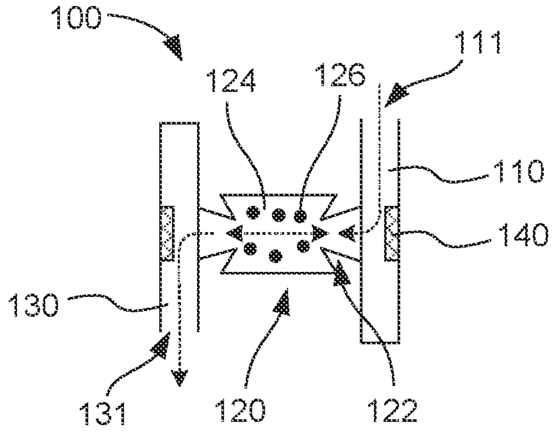
Figure 5:
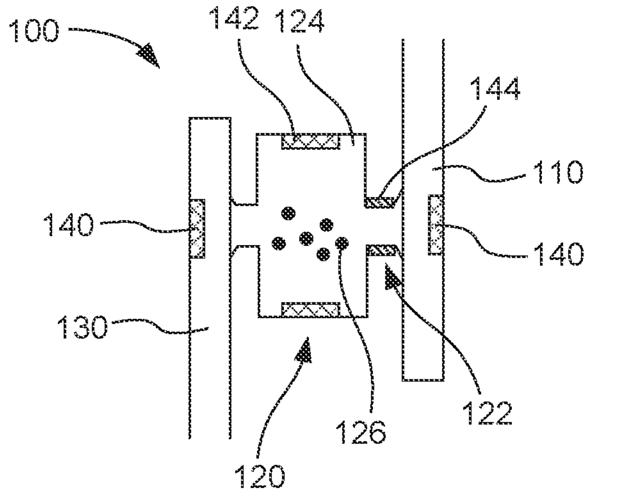
Figure 6:
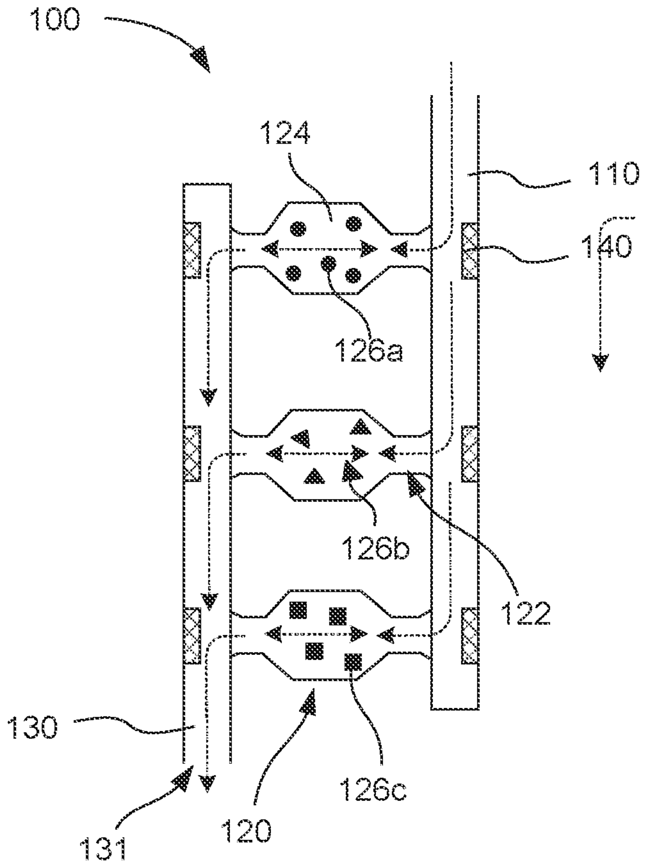

Notably, FIGS. 2-5 depict similar features that are commonly indicated with the same reference numerals as shown in FIG. 1, with a notable difference in the various structures of the respective reagent delivery networks 100 shown in those FIGS. Furthermore, some reagent delivery networks may include the ability for multiplexing, with multiple microfluidic cross-channels 120 between the inlet microfluidic channel 110 and the outlet microfluidic channel 130, as shown by way of example in FIG. 6. Reagent delivery networks can likewise be connected to other structures to form microfluidic processing systems, such as shown by way of example in FIGS. 7-11. Thus, the FIGS. are described herein together to some extent. For example, FIG. 2 is similar to that shown in FIG. 1, except that the microfluidic cross-channel includes a constricted region at both ends thereof. FIG. 3 and FIG. 4 are also similar to that shown in FIG. 2, except that the shapes of the cross-channel and the constricted regions are also shaped differently. FIG. 5 is similar to that shown in FIG. 3, except that the reagent storage chamber 124 includes chamber resistors 142 and a sensor 144, as described in greater detail hereinafter. Furthermore, FIGS. 3-6 each include examples where there is a resistor in both the inlet microfluidic channel and the outlet microfluidic channel, which provides the added benefit of allowing for bi-directional flow or mixing in the microfluidic cross-channel. There are also other differences as will be pointed out hereinafter.

In further detail regarding the various examples shown and described in the FIGS., the inlet microfluidic channel 110 can include an ingress opening 111 that permits flowing of a fluid (f) into the microfluidic cross-channel 120. The outlet microfluidic channel 130 can include an egress opening 131 that permits flowing of a fluid out of the microfluidic cross-channel. The inlet microfluidic channel and the outlet microfluidic channel can independently have a cross-sectional channel average size or a diameter that can range from 10 μm to 100 μm. In other examples, the inlet microfluidic channel and the outlet microfluidic channel can have a cross-sectional channel average size or a diameter (perpendicular to the direction of fluid flow) that can independently range from 10 μm to 50 μm, from 50 μm to 100 μm, from 25 μm to 75 μm, from 10 μm to 40 μm, from 30 μm to 90 μm, or from 40 μm to 80 μm. The inlet microfluidic channel and the outlet microfluidic channel can independently have a linear pathway, a curved path, a pathway with turns, a branched pathway, a serpentine pathway, or any other pathway configuration. In some examples, the inlet microfluidic channel and the outlet microfluidic may be arranged parallel to one another in the reagent delivery network.

The microfluidic cross-channel 120 can connect the inlet microfluidic channel 110 to the outlet microfluidic channel 130, as mentioned. The microfluidic cross-channel may branch off from a sidewall of the inlet microfluidic channel and may be connected to a side-wall opening of the outlet microfluidic channel. The microfluidic cross-channel may form a right angle with respect to the inlet microfluidic channel, the outlet microfluidic channel, or a combination thereof, though other angles can likewise be used. In the examples shown, the inlet microfluidic channel, the outlet microfluidic channel, and the microfluidic cross-channel can form an H-like configuration. In yet other examples, the microfluidic cross-channel can form an angle that is not a right angle, and thus, the angle of the cross-channel may be acute or obtuse relative to the direction of fluid flow along through the inlet microfluidic channel and into the microfluidic cross-channel. Likewise, the microfluidic cross-channel can form an angle that is acute or obtuse relative to the direction of fluid flow from within the outlet microfluidic channel.

In some examples, the microfluidic cross-channel 120 can be shaped to increase a bursting pressure threshold of a capillary retention meniscus formed. For example, the microfluidic cross-channel can include tapered or pointed sidewalls extending outward from the reagent storage chamber towards the constriction region, as illustrated in FIG. 4. When a bursting pressure threshold is generated, the capillary retention meniscus may burst, and fluid may be permitted to flow further downstream into the microfluidic cross-channel, a reagent storage chamber, and/or an outlet microfluidic channel.

The microfluidic cross-channel 120 can have a reagent storage region 124 having a cross-sectional channel average size or a diameter (perpendicular to the direction of fluid flow) that can range from 5 μm to 30 μm. In some examples, the reagent storage region can have a cross-sectional channel average size or a diameter that can range from 10 μm to 20 μm, from 5 μm to 25 μm, from 5 μm to 15 μm, from 10 μm to 30 μm, from 15 μm to 30 μm, or from 20 μm to 30 μm. The microfluidic cross-channel 120 can include a constriction region(s) that can have a cross-sectional channel average size or a diameter (perpendicular to the direction of fluid flow) ranging from 5 μm to 20 μm, from 5 μm to 10 μm, or from 5 μm to 15 μm, with the proviso that the constriction region is smaller in average size or diameter than the reagent storage region of the microfluidic cross-channel. The constriction region(s) and in some instances the reagent storage region may have a cross-sectional channel average size or a diameter that is smaller than a cross-sectional channel average size or a diameter of the inlet microfluidic, the outlet microfluidic channel, or a combination thereof.

The constriction region 122 can have a cross-sectional channel average size or a diameter suitable to form a capillary retention meniscus. A capillary retention meniscus can form along a gas-liquid interface of the construction region. As a fluid is flowed through the inlet microfluidic channel, the outlet microfluidic channel, or a combination thereof, a gas-liquid interface may form at the constriction region of the microfluidic cross-channel. The capillary retention meniscus can act as a valve which can prevent fluid from flowing further in the reagent delivery network. Thus, as mentioned, the microfluidic cross-channel may include a single constriction region 122 upstream or downstream relative to the reagent storage chamber 124 or may include dual constriction regions located upstream and downstream of the reagent storage chamber.

The reagent storage chamber 124 can have a size and shape suitable to contain a reagent 126 therein, such as a dried reagent. In some examples the reagent storage chamber may have an interior space suitable to contain 0.1 ng to 100 ng of reagent. In yet other examples, the reagent storage chamber may have an interior space suitable to contain 0.1 ng to 0.5 ng, from 1 ng to 5 ng, from 5 ng to 50 ng, from 10 ng to 50 ng, from 25 ng to 75 ng, or from 75 ng to 100 ng of reagent. In some examples, a configuration of the reagent storage chamber can be square, rectangular, polygonal, circular, or another configuration. Furthermore, the reagent storage chamber may include reagent, or reactants therein. The term "dried reagent" as used herein, does not indicate that the reagent is dry at every point in time, such as during manufacture, loading, or dispersing of the reagent therein. To illustrate, dried reagent can be loaded (dispersed) in a carrier fluid to form a loading fluid (to load the reagent at the reagent storage chamber). The carrier fluid may be removed by heating the carrier fluid to evaporate the carrier fluid off, by lyophilizing the reagent delivery network in a lyophilizer, freeze-dryer, desiccator, or the like.

The reagent 126 can vary based on the intended use of the reagent delivery network 124. For example, the reagent can include nucleic acid primers when conducting a chain reaction assay. In other examples, the reagent can include secondary antibodies when conducting ELISA sandwich assays. In still other examples, the reagent can be a mixture of reagents. For example, a mixture of reagents could include a PCR mastermix. A PCR mastermix could include polymerases, magnesium salt, buffer, bovine serum albumin (BSA), primers, or combinations thereof. In some examples, the reagent can further include optical markers such as intercalating dye, TaqMan probes, or the like.

As shown by example in FIG. 5, the reagent delivery network 100 may further include a sensor 144. The sensor can be located near the constriction region. The sensor can be operable to determine the presence of a capillary restriction meniscus. In some examples, the sensor can include a wet-dry sensor. A dry-sensor state may indicate a presence of a capillary retention meniscus. A wet-sensor state may indicate that a capillary retention meniscus has burst and can indicate a presence of fluid. A sensor can send feedback to a controller. Following feedback from the sensor, the controller can determine whether further actuation of the resistor (s), chamber resistor(s), or combination thereof is desired.

Also shown in FIG. 5, the reagent delivery network 100 can further include chamber resistor 142 in the microfluidic cross-channel 120. In some examples, a single chamber resistor can be located in the reagent storage chamber. The chamber resistor can provide an upward force and gravity can provide a downward force, thereby admixing the fluid and the reagent, e.g., dried reagent. In other examples, two chamber resistors can be located within the reagent storage chamber with chamber resistors being positioned across from one another. A chamber resistor can permit cross-directional fluid flow from the fluid flow pathway along the reagent delivery network. The cross-directional fluid flow can cause fluid to flow up and down within the reagent storage chamber. The up and down fluid flow can permit agitation of the fluid and the reagent therein and can increase mixing of the fluid with the reagent. A power density of the chamber resistor can range from 75 $MW/m^2$ to 1,000 $MW/m^2$, 100 $MW/m^2$ to 300 $MW/m^2$, from 200 $MW/m^2$ to 500 $MW/m^2$, from 500 $MW/m^2$ to 650 $MW/m^2$, or from 800 $MW/m^2$ to 1,000 $MW/m^2$. A chamber resistor can be operable to generate a voltage ranging from 5 V to 400 V, from 100 V to 300 V, from 5 V to 150 V, from 5 V to 75 V, from 5 V to 40 V, or from 200 V to 300 V.

The resistor(s) 140, chamber resistor(s) 142, or combination thereof can be coupled to a controller (not shown). The controller can be a part of the reagent delivery network or separate from the reagent delivery network. The controller can be operable to actuate the resistor(s), chamber resistor (s), or combination thereof permitting selective actuating of said resistor.

Referring now to FIG. 6, a reagent delivery network 100 may include multiple reagent storage chambers 124 connecting the inlet microfluidic channel 110 and outlet microfluidic channel 130 together. The various reagent storage chambers may include different reagents (126*a*, 126*b*, and 126*c*) relative to other reagent storage chambers. The use of multiple different reagents can allow for a reaction in series with a sample or can allow for multiple different reagents to be tested against one sample fluid, or can be used for various nucleic amplification processes, for example. To illustrate, the three individual reagent storage chambers can include a different set of nucleic acid primers, and these primers can be reconstituted in sequence for amplification downstream from the reagent delivery network. Other reagent may likewise be used as may be desirable for a given application.

The reagent delivery network 100 can further include a resistor(s) 140. In some examples a resistor can be operable to generate a pressure above a pressure threshold of a capillary retention meniscus in an amount sufficient to break the capillary retention meniscus or push the capillary retention meniscus into the reagent storage chamber thereby allowing a fluid to enter the reagent storage chamber when fluid is situated within the inlet microfluidic channel. The resistor can create a burst of pressure or a pressure pulse above the pressure threshold of the capillary retention meniscus. The pressure can expand and burst or push the capillary retention meniscus out of the constriction region.

The resistor(s) 140 can be sized and shaped to have a power sufficient to generate said pressure. In an example, a resistor can have a width ranging from 4 μm to 100 μm and can have an aspect ratio from 1:1 to 1:100. A power density of the resistor can range from 100 $MW/m^2$ to 1,000 $MW/m^2$, from about 100 $MW/m^2$ to 500 $MW/m^2$, from 250 $MW/m^2$ to 750 $MW/m^2$, or from 500 $MW/m^2$ to 1,000 $MW/m^2$. A resistor can be operable to generate a voltage ranging from 5 V to 400 V, from 100 V to 300 V, from 200 V to 4000 V from 5 V to 150 V, from 5 V to 40 V, or from 5 V to 75 V.

In other examples, resistor(s) 140 can be positioned to break or burst a capillary retention meniscus. In an example, a resistor can be located across from the microfluidic cross-channel along the inlet microfluidic channel, the outlet microfluidic channel, or a combination thereof. In an example, a resistor can be located along an inlet microfluidic channel across from the constriction region. A resistor in said location can push a gas bubble forming the capillary retention meniscus into the reagent storage chamber, burst a gas bubble forming the capillary retention meniscus, or push a fluid into and/or out of the reagent storage chamber. In some examples, a reagent delivery network can include a resistor along an inlet microfluidic channel and an outlet microfluidic channel. The inclusion of two resistors along opposing ends of the reagent storage chamber can generate back and forth pressure which can push and pull a fluid in and out of the reagent storage chamber thereby providing a mixing force. A resistor along the outlet microfluidic channel may be positioned to push or pull fluid through the reagent storage chamber. The resistors can also be positioned to function as pumps which can control fluid delivery into microfluidic channels.

Microfluidic Processing Systems

Microfluidic processing systems 200 are illustrated in FIGS. 7-11, and can include any of the reagent delivery networks 100 described herein and/or illustrated in FIGS. 1-6. The reagent delivery networks may not be referenced in as much detail as in FIGS. 1-6, but those details are incorporated into the microfluidic processing system examples herein.

Figure 7:
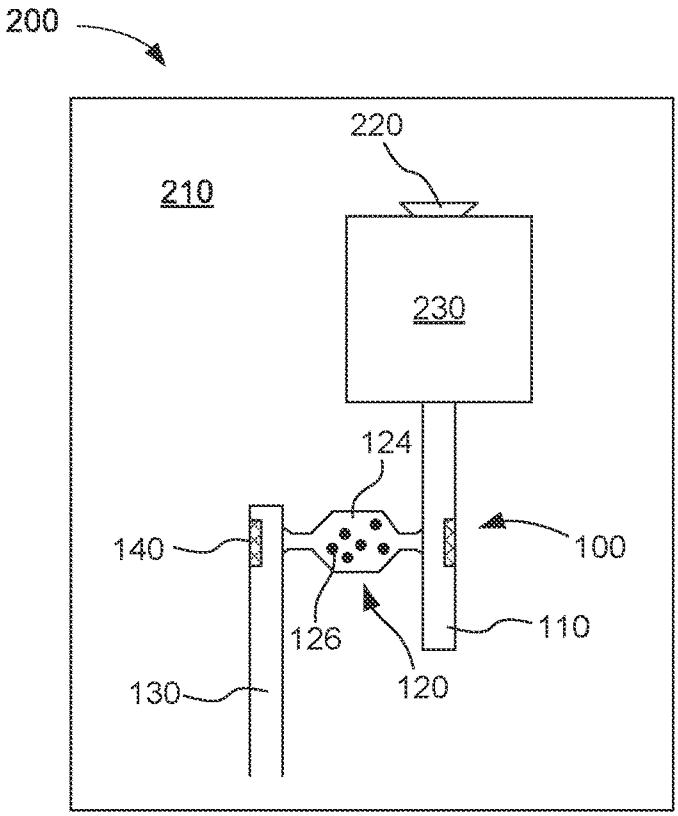
FIG. 7 is a schematic view of an example reagent delivery network with a sample receiving chamber associated with an inlet microfluidic channel in accordance with the present disclosure.

As shown by way of example in FIG. 7, a microfluidic processing system can include a substrate 210, a sample port 220 fluidly coupled to an inlet microfluidic channel, and a reagent delivery network. In this example, the sample port is fluidly coupled to the inlet microfluidic channel via a sample receiving chamber 230, but could include the sample-receiving port coupled directly to the inlet microfluidic channel (now shown). In other examples, the reagent delivery network may include multiple reagent storage chambers such as that described and illustrated by way of example in FIG. 6. In this particularly example, the substrate may be a single layer or multi-layer substrate. A material of the substrate can include SU-8, glass, silicon, polydimethylsiloxane (PDMS), polystyrene, polycarbonate, polymethyl methacrylate, poly-ethylene glycol diacrylate, perflouroaloxy, fluorinated ethylenepropylene, polyfluoropolyether diol methacrylate, polyurethane, cyclic olefin polymer, Teflon, copolymers, and combinations thereof. In some examples, the microfluidic substrate can include a hydrogel, ceramic, thermoset polyester, thermoplastic polymer, or a combination thereof. In other examples, the microfluidic substrate can include silicon. In still other examples, the substrate can include a low-temperature co-fired ceramic. In a further example, the substrate can include SU-8. The substrate may include an optically transparent area. "Optically transparent" indicates that a material of the substrate (or a portion thereof) is of a material that permits at least 90% of a wavelength of light within an emission range of a light source or a detection range of an optical detector to pass through the optically transparent area.

The sample port 220 may be configured to allow for the introduction of a sample fluid into the microfluidic processing system 200. The sample port can be fluidly coupled to the inlet microfluidic channel 110. The fluidic coupling can be direct or indirect. For example, the sample port may be directly coupled to the inlet microfluidic channel without intervening structures in-between. In other examples, a sample port can be coupled to the sample receiving chamber 230 and the sample receiving chamber can be coupled to the inlet microfluidic channel, as illustrated by way of example in FIG. 7.

Figure 8:
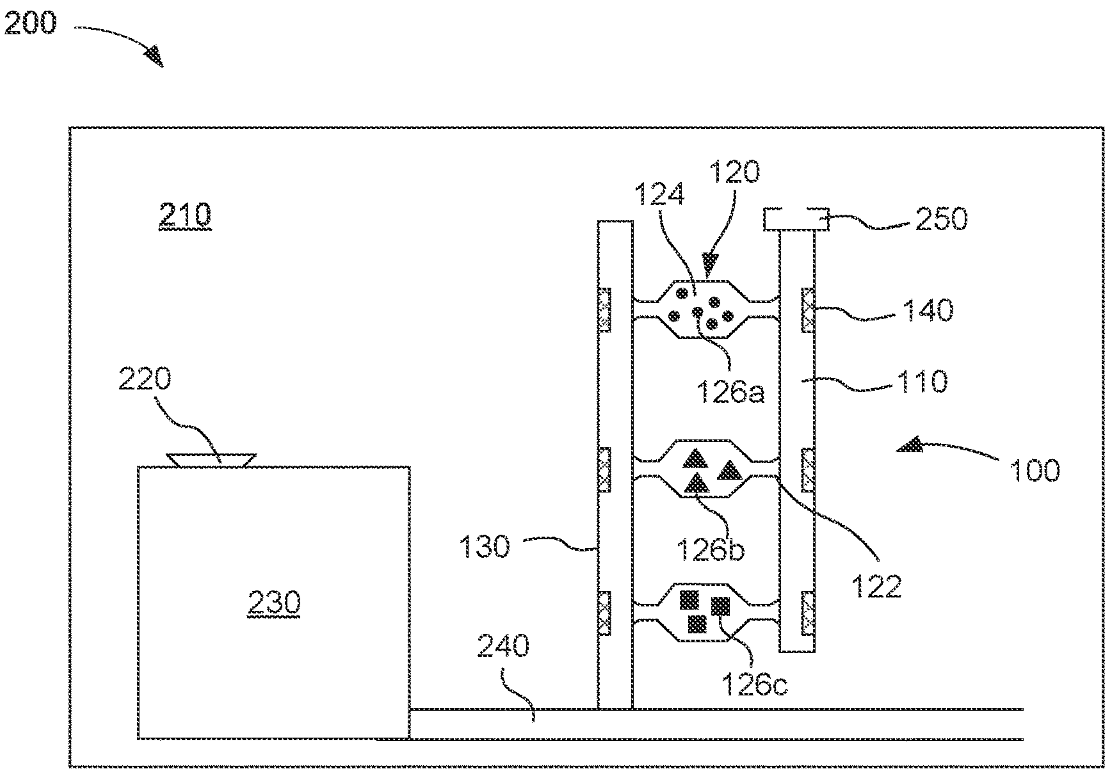
FIG. 8 is a schematic view of an example reagent delivery network with a sample receiving chamber associated with an outlet microfluidic channel associated with downstream microfluidics, e.g., a microfluidic processing channel of a microfluidic processing system, in accordance with the present disclosure.

In still other examples, as shown in FIG. 8, the sample port 220 can be coupled to the sample receiving chamber 230, which can be coupled to a microfluidic processing channel 240. In this example, the microfluidic processing channel can be fluidly coupled to the reagent delivery network 100 at the outlet microfluidic channel 130. When fluidly coupled to the outlet microfluidic channel 130, a carrier fluid or buffer solution, for example, can be flowed into the reagent delivery network and into the inlet microfluidic channel to disperse or dissolve the reagent 126*a*, 126*b*, 126*c* still further downstream in one or more of the reagent storage chambers 124, resulting in a reconstituted reagent that is carried downstream via the outlet microfluidic channel and into the microfluidic processing channel. This configuration includes an inlet port 250, separate of the sample port.

In further detail, the microfluidic processing system 200 can include a heating element 260. The heating element may be integrated into the substrate or may be a separate component from the substrate. The types of heating elements that can be used include a resistive heating element, a field-effect transistor, a p-n junction diode, a thin film heater, a thermal diode, or a combination thereof. The heating element may be a resistive heating element. A resistive heating element may be coupled with a p-n junction diode. In other examples, the heating element can include a resistive heating element and a thermistor. A thermal resistor, if present, can apply heat to speed up a chemical reaction. The heating element can include a resistive heating element, field-effect transistor, p-n junction diode, thin film heater, thermal diode, or a combination thereof, and the heating element can include platinum, aluminum, copper, gold, silver, tantalum, titanium, nickel, tin, zinc, chromium, tungsten silicon nitride, tantalum aluminum, nichrome, tantalum nitride, chromium silicon oxide, poly-silicon, germanium, oxides, alloys, and combinations thereof. The heating element may be operable to heat fluid at a rate of 100° C./s to 50,000,000° C./s (e.g., pulses of heat ranging in duration from the order of hundreds of nanoseconds to milliseconds) or at a rate of 1,000° C./s to 10,000,000° C./s.

The heating element can permit consistent or pulsed heating. In some examples, the heating can be pulsed. Pulsed heating can provide suitable control in heating a fluid. In some examples, the heating element can be positioned to elevate a temperature of a fluid by 20° C. to 50° C. when pulsed on for 0.1 μs to 1 second. In an example, the heating element can be part of a microfluidic processing system that can be used for nucleic acid amplification. The heating element can allow for rapid thermal cycling and can be used to rapidly amplify a nucleic acid on time scale limits imposed by physical and chemical kinetics. Rapid thermal cycling can be used to amplify a nucleic acid within hold times from 0.05 seconds to 10 seconds, from 0.05 seconds to 1 second, from 0.5 seconds to 10 seconds, or from 0.5 seconds to 3 seconds for a denaturing, annealing, and extending phase during the amplification process. Rapid thermal cycling can be used for polymerase chain reaction, isothermal amplification, reverse transcription, forward transcription, or a combination thereof. In other examples, a continual heat can be applied for isothermal amplification. Other processes that may be carried out include loop mediated isothermal amplification (LAMP) or recombinase polymerase amplification (RPA), for example.

Figure 9:
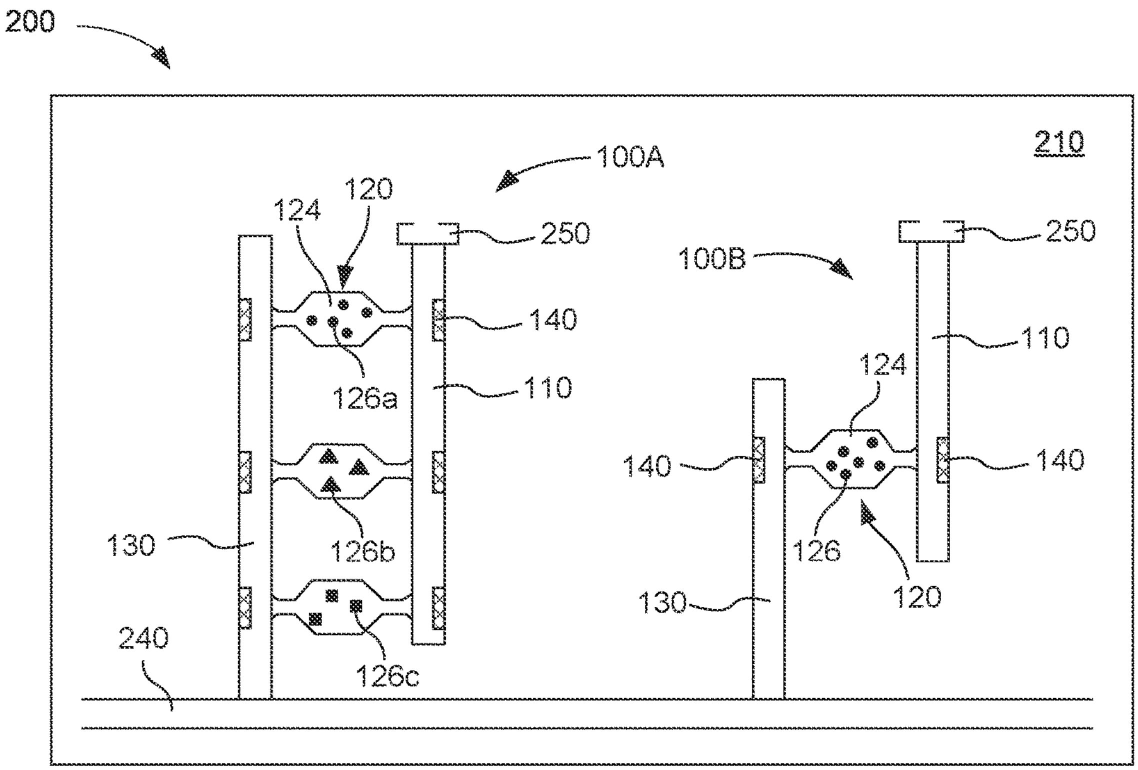
FIG. 9 is a schematic view of multiple example reagent delivery networks fluidly coupled to downstream microfluidics in parallel in accordance with the present disclosure.

FIG. 9 and FIG. 10 depict other examples of microfluidic processing systems 200 where multiple reagent delivery networks 100A and 100B are connected in parallel or in series. As shown in FIG. 9, multiple reagent delivery networks are shown connected to downstream microfluidics, e.g., a microfluidic processing channel 240 or other fluidic processing architecture, in parallel. Thus, processing from these multiple reagent delivery networks can occur independently of one another and fed the microfluidic processing channel separately to work together or independent of one another.

On the other hand, as shown in FIG. 10, the microfluidic processing channels 100A and 100B may be fluidly coupled together by segments of microfluidic processing channel 240, so that fluid flowing through a first reagent delivery network 100A will ultimately also pass through a second microfluidic network 100B, and so forth. Thus, reagent 126*a* picked up and reconstituted in the reagent delivery network 100A will be sent passed through reagent delivery network 100B, including the reconstituted reagent formed in the reagent delivery network 100A. Notably, processing components are not shown in this example, but may be present along the various microfluidic mixing channels. Thus, there may be processing components used that are not shown positioned prior to reaching the first reagent delivery network, between reagent delivery networks, or after passing through the multiple reagent delivery networks. Various processing that may occur at any of these locations is shown in greater detail by example in FIG. 11, for example. Thus, as shown, it is notable that the microfluidic inlet channels are fed from below (though orientation is not particularly an issue on the microfluidic scale, but this is mentioned for clarity in understanding fluid flow as shown in FIG. 10).

In further detail, individual outlet microfluidic channels 130 receive fluid as it passes through its microfluidic cross-channel and passes that fluid along to the next microfluidic processing channel, and so forth. The microfluidic processing channels can independently feed other architecture, such as the next reagent delivery network or an outlet 150. A system that includes a plurality of microfluidic cross-channels can include a single inlet microfluidic channel and a single outlet microfluidic channel that can respectively feed or receive a fluid there through. Each of the reagent delivery networks may have different reagents therein. The reagent delivery networks may be accessible in series or randomly. In some examples, a single fluid can be fed through the different reagent chambers. In yet other examples, multiple fluids can be fed through the different reagent chambers. Selectivity can be based on fluid flow or can be based on actuating of resistors. The fluid may be fed from the inlet microfluidic channel to the microfluidic cross-channel.

Another microfluidic processing system 200 including a reagent delivery network 100 can be utilized for temporal multiplexing as shown as microfluidic processing system 200 at FIG. 11. This FIG. depicts several fluid ports, several fluid ejectors, surface-active microparticles shown at multiple locations, several magnets for moving magnetizing surface-active microparticles, multiple detectors, etc. A microfluidic processing system for use in accordance with the present location can include or use some or all of these components, or even additional components not shown. FIG. 11 is provided to describe various processing examples.

The microfluidic processing system 200 shown in FIG. 11 thus includes a reagent delivery network 100 similar to that described in FIGS. 1-10, but in this instance, the multiple microfluidic cross-channels 120 each contain a different reagent 126*a*, 126*b*, and 127*c* in their respective reagent storage chamber 124. As in the prior examples, there is an inlet microfluidic channel 110 (with an inlet port 250), an outlet microfluidic channel 130, and a plurality of resistors 140. In this example, the inlet port may be used to introduce fluids such as elution buffer, and the reagents can be used selectively to interact with the elution buffer based on how or when the individual resistors are energized. The reagent delivery network portion of the microfluidic processing system can operate similarly as that described previously.

The reagent delivery network 100 of the microfluidic processing system 200 can be fluidly coupled to other microfluidics, as shown by way of example in FIG. 11. For example, the microfluidic processing system can include a sample port 220 and a sample receiving chamber 230 for receiving sample fluid, which in this example includes surface-active microparticles which may be magnetizing microparticles. In this example, from the sample receiving chamber, a microfluidic processing channel 240 can be present that transports the sample fluid (with or without surface-active microparticles, depending on the application) in a direction toward an ejector 290 (E3) for dispensing of the fluid after processing within the microfluidic processing system. Other ejectors may also be included, shown at E1 and E2, for ejecting fluid into the microfluidic processing channel, for example. Also shown in this example are three additional secondary inlets 270 with secondary inlet microchannels 280, identified further as C1, C2, and C3. The secondary inlet microchannels located upstream of the reagent delivery network (C1 and C2) can permit loading of wash buffer, transport buffer, buffer containing reagents for downstream reactions, or the like. In the case of nucleic acid amplification, a post processing wash buffer may be introduced via another secondary inlet microchannel (C3), which can be used to wash the downstream portion of fluid after processing and/or mixing of fluids and/or dried reagents, e.g., a post amplification wash buffer. Washing can permit multiplexing of different nucleic acids in a sample fluid with different sets of primers introduced sequentially using the reagent delivery network 100 described previously. Following multiplexing of a nucleic acid, for example, the microfluidic processing channel can be washed with a wash buffer, a portion of sample fluid passed into the microfluidic processing channel, and another primer multiplexed with that portion of the sample fluid. In other examples, the microfluidic processing system can include integrated chambers prefilled with buffers in addition to or in place of additional fluid inlets.

In further detail, the microfluidic processing system 200 along the microfluidic processing channel 240 can include magnets 245. The magnets can be used for collecting and/or moving magnetizing microparticles 235 that are surface-activated along the microfluidic processing channel, for example. The magnets, identified individually as M1, M2, and M3, can be movable along the microfluidic processing channel and/or can be moved closer to or further from the microfluidic processing channel, or can be electromagnetically modified to be interactive with the magnetizing microparticles or not interactive with the magnetizing microparticles. In further detail, the magnet can be capable of generating a magnetic field, such as a magnetic field that can be turned on and off by introducing electrical current/voltage to the magnet. Alternatively, the magnet can be a permanent magnet that is placed in proximity to the microfluidic processing system to effect movement of surface-activated microparticles that are magnetic or magnetizing. The magnet can be permanently placed within this proximity, or can be movable along the microfluidic processing system, or movable in position and/or out of position to effect movement of the surface-activated microparticles. Magnetic surface-activated microparticles can be magnetized by the magnetic field generated by the magnet. In addition, the magnet can create a force capable of pulling the magnetic surface-activated microparticles through the microfluidic processing system. When the magnet is turned off or not in appropriate proximity, the magnetic surface-activated microparticles can reside in place or be passed through the microfluidic processing system using fluid flow. The use of magnetic surface-activated microparticles can permit portions of the sample fluid to be passed through a microfluidic processing channel, while other portions of the sample fluid remain in the sample receiving chamber.

One or multiple thermocycling heaters 260 can be included along the microfluidic processing channel adjacent to or operable in association with a thermocycling heater 260 to thermocycle fluidic or fluidic microparticle mixtures prepared using the microfluidic processing system. Two thermocyling heaters are shown by way of example at H1 and H2. In some examples, the fluids after processing can be thermocycled, for example, if the nucleic acid corresponding to the primer picked up from the reagent delivery network amplified, and amplification can be detected using a detector 260 (D1) outside the channel, for example, e.g., amplification detection with a fluorescence detector. After amplification, for example, post amplification wash buffer can be pumped through the thermocycling heater region to remove any amplified nucleic acid there as well as any primers, and the resulting fluid composition can be dispensed via an ejector 290 (E3). This wash buffer may contain reagents to degrade nucleic acids, e.g., nucleases, to prevent contamination of amplification for other runs with the same primer set.

Regarding the detector(s) 255, two are shown at D1 and D2. A detector can be used for purposes of detecting sample fluid along with fluids/microparticles admixed therewith that may be positioned along microfluidic processing channel 240 as well, either associated or located at or near a magnet 245 and/or a thermocycling heater 260, or elsewhere along the microfluidic processing channel or other location. The detector may be an optical detector, for example, with an illumination source (not shown) to illuminate the fluids within the microfluidic processing channel. The optical detector can receive data relating to the sample fluid. An illumination source can be operable to emit light towards the wall or portion of the wall of the substrate that is optically transparent. The detector can be operable to detect fluorescence emitted from a fluorescent molecule which can be loaded in the system and can become conjugated with a nucleic acid in the sample fluid during nucleic acid amplification. In other examples, the optical detector can be located with respect to the optically transparent area such that a light beam passes through the optically transparent area onto an optical detector or to an element capable of directing the light beam to the optical detector. In some examples, an optical detector can include a band pass filter and a p-n junction diode. A band pass filter passes frequencies in a certain range while attenuating frequencies outside that range. The band pass filter can permit a fluorescing wavelength emitted by the excited fluorescent molecule, allowing a p-n junction diode is a two-terminal semiconductor capable of converting light into an electrical current when photons are absorbed in the photodiode.

In further detail regarding the surface-activated microparticles, the surfaces can be adapted to bind with a biological component or can be bound to the biological component in the sample fluid. Surface activated microparticles can include surface groups that are interactive with a biological component of a biological sample or can include a covalently attached ligand attached to a surface of the microparticles to likewise bind with a biological component of a biological sample. In some examples, the ligand can include proteins, antibodies, antigens, nucleic acid primers, amino groups, carboxyl groups, epoxy groups, tosyl groups, sulphydryl groups, or the like. The ligand can be selected to correspond with and bind with the biological component and can vary based on the type of biological component being isolated from the biological sample. For example, the ligand can include a nucleic acid primer when isolating a biological component that includes a nucleic acid sequence. In other examples, the ligand can include an antibody when isolating a biological component that includes antigen.

In some examples, the surface-activated microparticles can have an average particle size that can range from about 0.1 μm to about 70 μm. The term "average particle size" describes a diameter or diameter of the volume of the particles if modified to a spherical size based on the particle volume, which may vary, depending upon the morphology of the individual particle. A shape of the surface-activated microparticles can be spherical, irregular spherical, rounded, semi-rounded, discoidal, angular, sub-angular, cubic, cylindrical, or any combination thereof. In some examples, the particles can include spherical particles, irregular spherical particles, or rounded particles. The shape of the surface-activated microparticles can be spherical and uniform, which can be defined herein as spherical or near-spherical, e.g., having a sphericity of >0.84. Thus, any individual particles having a sphericity of <0.84 are considered non-spherical (irregularly shaped). The particle size of the substantially spherical particle may be provided by its diameter, and the particle size of a non-spherical particle may be provided by its average diameter (e.g., the average of multiple dimensions across the particle) or by an effective diameter, e.g., the diameter of a sphere with the same mass and density as the non-spherical particle. In further examples, the average particle size of the surface-activated microparticles can range from about 1 μm to about 50 μm, from about 5 μm to about 25 μm, from about 0.1 μm to about 30 μm, from about 40 μm to about 60 μm, or from about 25 μm to about 50 μm.

The surface-activated microparticles can be in the form of magnetizing microparticles. The term "magnetizing microparticles" is defined herein to include microparticles that may not be magnetic in nature unless and until a magnetic field is introduced at a strength and proximity to cause them to become magnetic. Their magnetic strength can be dependent on the magnetic field applied and may get stronger as the magnetic field is increased, or the magnetizing microparticles get closer to the magnetic source that is applying the magnetic field. Magnetizing microparticles can include paramagnetic microparticles, superparamagnetic microparticles, diamagnetic microparticles, or a combination thereof, for example. Commercially available examples of magnetizing microparticles that are surface-activated include those sold under the trade name DYNABEADS®, available from ThermoFischer Scientific (USA).

In more specific detail, "paramagnetic microparticles" may have the ability to increase in magnetism when a magnetic field is present; however, paramagnetic microparticles are not magnetic when a magnetic field is not present. In some examples, the paramagnetic microparticles can exhibit no residual magnetism once the magnetic field is removed. A strength of magnetism of the paramagnetic microparticles can depend on the strength of the magnetic field, the distance between a source of the magnetic field and the paramagnetic microparticles, and a size of the paramagnetic microparticles. As a strength of the magnetic field increases and/or a size of the paramagnetic microparticles increases, the strength of the magnetism of the paramagnetic microparticles increases. As a distance between a source of the magnetic field and the paramagnetic microparticles increases the strength of the magnetism of the paramagnetic microparticles decreases. "Superparamagnetic microparticles" can act similar to paramagnetic microparticles; however, they can exhibit magnetic susceptibility to a greater extent than paramagnetic microparticles in that the time it takes to become magnetized appears to be near zero seconds. "Diamagnetic microparticles," on the other hand, can display magnetism due to a change in the orbital motion of electrons in the presence of a magnetic field.

Regardless of the configuration, the microfluidic processing system can be manufactured as part of a microfluidic chip. In some examples, the microfluidic chip can be a lab on chip system. The lab on chip system can be a point of care system. For example, the lab on chip system can include a polymerase chain reaction lab on chip system which can include multiple reagent delivery networks connected in series along the inlet microfluidic channel, and can include different primers within each of the reagent delivery networks to allow for spectral multiplexing.

In further detail, the microfluidic processing systems 200 of FIGS. 7-11 can include elements from any of the other examples, with parts and configurations being available to be mixed and matched, as may be useful for a given application. For example, the systems may include additional fluid inlets, outlets, ports, ejectors, flow channels, reagent delivery networks, or the like. Additional fluid inlets can permit loading of fluids in the system and a location of the fluid inlets can vary based on design. The fluid inlets can permit loading of fluids into the system.

By way of example, the reagent delivery networks and/or the microfluidic processing systems of the present disclosure can be used for a variety of processes that may be tailored by an end user. For example, in a system where there is the ability for multiplexing, the reagent storage chambers may store any of a number of reagents, such as enzymes, chelating agents, primers for nucleic acid amplifications, reactants, etc. Furthermore, with multiplexing within a microfluidic network and/or multiplexing using multiple microfluidic networks connected in parallel or series fludically, reagents may even be selected by an end user as may be desired for a given application based on results from a prior step, leveraging flexibility for on the fly processing, e.g., diagnostics, amplification, assays, cheating, enzyme processing, etc.

As a practical example, if a nucleic acid is to be amplified after a nasal swab using a multiplexing reagent delivery network such as that shown in FIG. 6, or any of the systems shown in FIGS. 8-11, a first reagent selected for use (present in one of the reagent storage chambers) may that include an enzyme to degrade mucin, which is a protein related to mucous. Next, with the mucous degraded, a second reagent (in a second reagent storage chamber) may then be used to deliver primers for amplification of the nucleic acids in the nasal swab sample.

In other examples, if amplifying nucleic acids from blood, a first reagent that is reconstituted may include a chelating agent, e.g., EDTA to chelate out a portion of the iron, a reagent could be used to add additional magnesium to compensate for the iron that has been chelated, and then additional reagent may be introduced that could include amplification primers. These components could be added sequentially with washing cycles, for example. On the other hand, when there are multiple microfluidic networks as part of a common microfluidic processing system, one network may be used to store and use the EDTA and the subsequent network may be used to add in the magnesium. Thus, multiplexing can be carried out within individual microfluidic cross-channels of a common reagent delivery network and/or multiple microfluidic mixing channels may be used to stack various processes with user flexibility.

In still other examples, one or more of the reagent delivery networks can be coupled to microfluidics and processing components for carrying out processes such as cleaning, cell lysing, reverse transcriptase (converting RNA to DNA) by heating and holding with the assistance of an enzyme, e.g., delivered from the reagent delivery network, etc.

Methods of Reconstituting Reagents

A method of reconstituting a reagent is illustrated in FIG. 12. The method 300 can include flowing 310 fluid into an inlet microfluidic channel of a reagent delivery network, and forming 320 a capillary retention meniscus at a constriction region of a microfluidic cross-channel branching off from the inlet microfluidic channel. The microfluidic cross-channel includes a reagent storage chamber containing a reagent positioned beyond the constriction region. The method also includes firing 330 a resistor to generate a pressure change to break the capillary retention meniscus at the constriction region, and flowing 340 fluid through the constriction region and into the reagent storage chamber to combine fluid with the reagent to form a reconstituted reagent. In some examples, the method can include flowing the reconstituted reagent from the reagent storage chamber into an outlet microfluidic channel. In other examples, the method can include mixing the reagent with fluid in the reagent storage chamber to form the reconstituted reagent using a second resistor to flow the fluid back toward the resistor, chamber resistors located within the reagent storage chamber, or both. In still other examples, after forming the reconstituted reagent, the method can further include forming a second capillary retention meniscus at a second constriction region of a second microfluidic cross-channel branching off from the inlet microfluidic channel. The second microfluidic cross-channel can include a second reagent storage chamber containing a second reagent positioned beyond the second constriction region. Furthermore, in this particular example, the method can include firing a second resistor to generate a pressure change to break the second capillary retention meniscus at the second constriction region, and flowing fluid through the second constriction region and into the second reagent storage chamber to combine fluid with the second reagent to form a second reconstituted reagent.

In some examples, the reagent delivery network can further include a chamber resistor(s) within the reagent storage chamber. The method can further include actuating the chamber resistor(s) and generating a pressure change at the chamber resistor(s) to generate cross-directional fluid flow within the reagent storage chamber. In other examples, the method can include admixing the sample fluid with a variety of different dried reagents. The reagent delivery network can include multiple microfluidic cross-channels. The fluid can be flowed into each of the reagent storage chambers. The flowing of the fluid may be serial or in series through the plurality of the microfluidic cross-channels.

When the method is conducted for use within a microfluidic processing system described herein, there may be multiple reagent delivery networks connected in series or parallel, multiple reagent storage chambers within one or more of the reagent delivery networks, etc. In further detail, microfluidic processing system (downstream from one or more reagent delivery networks) may include a heating element(s), surface-activated microparticles, e.g., magnetizing with the use of a magnet, etc., pumps and/or ejectors, various inlet ports or chambers, etc. Furthermore, the method can include the use of reagent delivery networks that are suitable for multiplexing. For example, different reagents in different reagent storage chambers can include different primers. In other examples, the methods herein can include adhering nucleic acids in the sample to surface-activated microparticles, directing magnetizing surface-activated microparticles with the nucleic acids thereon with a magnet to a microfluidic processing channel, flowing carrier fluid into an inlet microfluidic channel of a reagent delivery network, forming a capillary retention meniscus at one or more microfluidic cross-channels branching off from the inlet microfluidic channel, and/or actuating a resistor positioned along the inlet microfluidic channel at a location to generate a pressure change to break the capillary retention meniscus. In further detail, the methods herein can include flowing the carrier fluid through the constriction region and into the reagent storage chamber to solubilize or suspend the dried reagent using the carrier fluid, actuating the resistor to direct the carrier fluid into the microfluidic processing channel where the carrier fluid joins the surface-activated microparticles, moving the carrier fluid and the magnetizing surface-activated microparticles to other areas within the system, e.g., to sensors, heating elements, etc., conducting thermal cycling, transporting fluid from the system through an outlet, ejecting the thermally cycled material using fluidjet architecture, inserting wash buffer into the system at the inlet port, or the like. These various processing steps may be used in any of a number of combinations using the microfluidic processing systems described herein, including processing where processing steps are repeating, such as to amplify a different nucleic acid in the sample fluid.

Definitions

As used in this specification and the appended claims, the singular forms “a,” “an,” and “the” include plural referents unless the content clearly dictates otherwise.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on presentation in a common group without indications to the contrary.

Concentrations, dimensions, amounts, and other numerical data may be presented herein in a range format. A range format is used merely for convenience and brevity and should be interpreted flexibly to include the numerical values explicitly recited as the limits of the range, and also to include all the individual numerical values or sub-ranges encompassed within that range as if each numerical value and sub-range is explicitly recited. For example, a numeric range that ranges from about 10 to about 500 should be interpreted to include the explicitly recited sub-range of 10 to 500 as well as sub-ranges thereof such as about 50 and 300, as well as sub-ranges such as from 100 to 400, from 150 to 450, from 25 to 250, etc.

The terms, descriptions, and figures used herein are set forth by way of illustration and are not meant as limitations. Many variations are possible within the disclosure, which is intended to be defined by the following claims—and equivalents—in which all terms are meant in the broadest reasonable sense unless otherwise indicated.

The following illustrates an example of the present disclosure. Numerous modifications and alternative compositions, methods, and systems may be devised without departing from the disclosure. The appended claims are intended to cover such modifications and arrangements.

EXAMPLE

Reagent Delivery Networks for Temporal Multiplexing

A sample fluid is inserted into the microfluidic processing system using components shown in FIG. 11 through a sample port, which enters a sample receiving chamber including magnetizing surface-activated microparticles. The microparticles react with or bind with a nucleic acid in the sample fluid. A portion of the nucleic acid reacted with the magnetizing surface-activated microparticles are moved using a magnet into the microfluidic processing channel. A carrier fluid is loaded into an inlet port forming a capillary retention meniscus at one of the openings to a microfluidic cross-channel. The resistor is activated forcing the carrier fluid into the reagent storage chamber thereby dissolving or dispersing the dried reagent in the carrier fluid. The carrier fluid with the reagent therein is forced into the outlet microfluidic channel by activating one or more resistors to cause flow through the outlet microfluidic channel into the microfluidic processing channel, meeting the portion of the sample fluid bound containing magnetizing surface-activated microparticles.

The surface activated microparticles along with the reagent are moved by a magnet to an area including a heating element. The magnetizing surface-activated microparticles are dissociated from sample components, and heating is cycled on and off, amplifying nucleic acid within the microfluidic processing channel. The amplified nucleic acid is then dispensed by ejection via an ejector.

A wash buffer is then flowed through an inlet port into the microfluidic processing channel to clear the flow channel in preparation for another amplification process. The process is repeated, flowing a carrier fluid through a different storage reagent chamber of the reagent delivery network including a different set of primers, allowing for the amplification of a different nucleic acid in the sample fluid.

This process is repeated a third time for a third amplification from a third set of primers from a third storage reagent chamber, for example.

While the present technology has been described with reference to certain examples, it will be appreciated that various modifications, changes, omissions, and substitutions can be made without departing from the spirit of the disclosure. It is intended, therefore, that the disclosure be limited only by the scope of the following claims.

What is claimed is:

1. A reagent delivery network, comprising:

an inlet microfluidic channel;

a microfluidic cross-channel branching off from the inlet microfluidic channel, wherein the microfluidic cross-channel includes:

a constriction region, and a reagent storage chamber having reagent therein;

an outlet microfluidic channel having a side-wall opening connected to the microfluidic cross-channel, the outlet microfluidic channel configured to receive fluid from the microfluidic cross-channel;

a first resistor positioned along the inlet microfluidic channel at a location and configured to redirect fluid from the inlet microfluidic channel into the microfluidic cross-channel;

a second resistor positioned at a location within the outlet microfluidic channel directly opposite the first resistor and configured to pull the fluid received from the inlet microfluidic channel through the microfluidic cross-channel down towards a microfluidic processing channel, wherein actuation of the first resistor pushes the fluid into the microfluidic cross-channel without passing into the outlet microfluidic channel, and actuation of the second resistor pulls the fluid from the microfluidic cross-channel into the outlet microfluidic channel toward the microfluidic processing channel; and a controller configured to mix the fluid by, repeatedly:

actuating the second resistor to flow the fluid back toward the first resistor and actuating the first resistor to push the fluid toward the second resistor.

2. The reagent delivery network of claim 1, wherein the first resistor is adapted to operate at a power density sufficient to break a capillary retention meniscus at the constriction region and deliver fluid from the inlet microfluidic channel and into the reagent storage chamber.

3. The reagent delivery network of claim 2, wherein the power density of the first resistor ranges from 100 $MW/m^2$ to 1,000 $MW/m^2$.

4. The reagent delivery network of claim 1, wherein the microfluidic cross-channel further includes a second constriction region adjacent to the outlet microfluidic channel.

5. The reagent delivery network of claim 1, further including a chamber resistor located within the reagent storage chamber to generate mixing of the reagent with fluid introduced through the constriction region.

6. The reagent delivery network of claim 1, wherein the reagent is a dried reagent to be reconstituted by fluid when introduced through the constriction region.

7. The reagent delivery network of claim 1, comprising multiple microfluidic cross-channels fluidically independently coupling the inlet microfluidic channel with the outlet microfluidic channel in series, wherein the multiple microfluidic cross-channels include:

the microfluidic cross-channel, and a second microfluidic cross-channel having a second reagent storage chamber having a second reagent stored therein;

a third resistor positioned along the inlet microfluidic channel at a second location and configured to cause the fluid to flow through a second constriction region and into the second reagent storage chamber, wherein actuation of the first resistor causes the fluid to flow through the constriction region and does not cause the fluid to flow through the second constriction region, and wherein actuation of the third resistor causes the fluid to flow through the second constriction region and does not cause the fluid to flow through the constriction region.

8. The reagent delivery network of claim 7, wherein the reagent and the second reagent independently include a nucleic acid primer, a secondary antibody, a PCR mastermix component, an optical marker; or a mixture thereof.

9. The reagent delivery network of claim 1, wherein the reagent delivery network is fluidly coupled in series with a second reagent delivery network, wherein the outlet microfluidic channel fluidically feeds into or is a second inlet microfluidic channel of the second reagent delivery network.

10. The reagent delivery network of claim 1, further comprising a second reagent delivery network including a second inlet microfluidic channel, a second microfluidic cross-channel branching off from the second inlet microfluidic channel, and a second outlet microfluidic channel, wherein the outlet microfluidic channel of the reagent delivery network and the second outlet delivery channel of the second reagent delivery network are fluidly coupled in parallel to the microfluidic processing channel.

11. A method of reconstituting reagent, comprising:

flowing fluid into an inlet microfluidic channel of a reagent delivery network, the reagent delivery network comprising:

the inlet microfluidic channel;

a microfluidic cross-channel branching off from the inlet microfluidic channel, wherein the microfluidic cross-channel includes:

a constriction region, and a reagent storage chamber having reagent therein;

an outlet microfluidic channel having a side-wall opening connected to the microfluidic cross-channel, the outlet microfluidic channel configured to receive fluid from the microfluidic cross-channel;

a first resistor positioned along the inlet microfluidic channel at a location and configured to redirect fluid from the inlet microfluidic channel into the microfluidic cross-channel;

a second resistor positioned at a location within the outlet microfluidic channel directly opposite the first resistor and configured to pull the fluid received from the inlet microfluidic channel through the microfluidic cross-channel down towards a microfluidic processing channel, wherein actuation of the first resistor pushes the fluid into the microfluidic cross-channel without passing into the outlet microfluidic channel, and actuation of the second resistor pulls the fluid from the microfluidic cross-channel into the outlet microfluidic channel toward the microfluidic processing channel;

forming a capillary retention meniscus at the constriction region of the microfluidic cross-channel branching off from the inlet microfluidic channel, wherein the microfluidic cross-channel includes the reagent storage chamber containing the reagent positioned beyond the constriction region;

firing the first resistor to generate a pressure change to break the capillary retention meniscus at the constriction region;

flowing the fluid through the constriction region and into the reagent storage chamber to combine the fluid with the reagent to form a reconstituted reagent; and mixing, using a controller, the fluid by:

repeatedly actuating the second resistor to flow the fluid back toward the first resistor and actuating the first resistor to push the fluid toward the second resistor.

12. The method of claim 11, further comprising flowing the reconstituted reagent from the reagent storage chamber and into the outlet microfluidic channel.

13. The method of claim 12, further comprising mixing the reagent with the fluid in the reagent storage chamber to form the reconstituted reagent using:

chamber resistors located within the reagent storage chamber.

14. The method of claim 11, wherein after forming the reconstituted reagent, the method further comprises:

forming a second capillary retention meniscus at a second constriction region of a second microfluidic cross-channel branching off from the inlet microfluidic channel, wherein the second microfluidic cross-channel includes a second reagent storage chamber containing a second reagent positioned beyond the second constriction region;

firing a third resistor to generate a pressure change to break the second capillary retention meniscus at the second constriction region; and flowing fluid through the second constriction region and into the second reagent storage chamber to combine fluid with the second reagent to form a second reconstituted reagent.

* * * * *